(12) United States Patent
Huang (10) Patent No.: US 10,812,744 B2
(45) Date of Patent: Oct. 20, 2020

(54) DEFECTIVE PIXEL COMPENSATION METHOD AND DEVICE (71) Applicant: REALTEK SEMICONDUCTOR CORPORATION, Hsinchu (TW)

(72) Inventor: Wen-Tsung Huang, Chiayi (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 49 days.

(21) Appl. No.: 16/161,518

(22) Filed: Oct. 16, 2018

(65) Prior Publication Data
US 2019/0141268 A1    May 9, 2019

(30) Foreign Application Priority Data
Nov. 6, 2017 (TW) .............. 106138325 A (51) Int. Cl.
H04N 5/367 (2011.01)
H04N 9/04 (2006.01)

(52) U.S. Cl.
CPC .......... H04N 5/3675 (2013.01); H04N 9/045 (2013.01); H04N 9/04553 (2018.08)

(58) Field of Classification Search
CPC .. H04N 5/3675; H04N 9/04553; H04N 9/045; H04N 5/367; H04N 5/365; H04N 5/332
See application file for complete search history.

(56) References Cited

U.S. PATENT DOCUMENTS

| 8,164,660 | B2 | 4/2012 | Xiong et al. |
| 8,971,659 | B2 | 3/2015 | Forutanpour |
| 9,313,467 | B2 | 4/2016 | Chen et al. |
| 2004/0032516 | A1* | 2/2004 | Kakarala ............... G06T 3/4015 348/246 |

FOREIGN PATENT DOCUMENTS

| CN | 106488209 A | 3/2017 |
| TW | 201108720 A | 3/2011 |
| TW | I393451 B | 4/2013 |
| TW | 201536053 A | 9/2015 |

OTHER PUBLICATIONS

Taiwan Intellectual Property Office, Office action dated May 23, 2018. English summary on p. 1.

* cited by examiner

Primary Examiner — Nicholas G Giles
(74) Attorney, Agent, or Firm — WPAT, PC (57) ABSTRACT

The present invention discloses a defective pixel compensation method and device capable of compensating for defective pixels of an RGBIr sensor. An embodiment of the method includes: determining the type of a sensor; determining a plurality of sample positions according to the type of the sensor and the position of a target pixel; obtaining the values of a plurality of reference pixels in a sampling window according to the sample positions; determining a value range and at least one compensation value(s) according to the values of the reference pixels; determining whether an input value of the target pixel is within the value range; when the input value is within the value range, outputting the input value as an output value of the target pixel; and when the input value is outside the value range, outputting one of the compensation value(s) as the output value of the target pixel.

19 Claims, 10 Drawing Sheets

| $G_{REF}$ |  | $G_{REF}$ |  | $G_{REF}$ |
|---|---|---|---|---|
|  | $G_{REF}$ |  | $G_{REF}$ |  |
| $G_{REF}$ |  | T |  | $G_{REF}$ |
|  | $G_{REF}$ |  | $G_{REF}$ |  |
| $G_{REF}$ |  | $G_{REF}$ |  | $G_{REF}$ |

Fig. 5

| $Ir_{REF}$ | | $Ir_{REF}$ | | $Ir_{REF}$ |
|---|---|---|---|---|
| | | | | |
| $Ir_{REF}$ | | T | | $Ir_{REF}$ |
| | | | | |
| $Ir_{REF}$ | | $Ir_{REF}$ | | $Ir_{REF}$ |

DEFECTIVE PIXEL COMPENSATION METHOD AND DEVICE

BACKGROUND OF THE INVENTION

1. Field of the Invention

The present invention relates to a defective pixel compensation technique, especially to a technique capable of compensating for defective pixels of a sensor including four types of pixels.

2. Description of Related Art

A conventional RGB sensor lacks sensitivity in a dark environment. In view of this problem, some image capture device for monitor applications uses an infrared (IR) cut filter to output an RGB color image in a daylight mode and output an IR image in a night mode. However, the IR cut filter is mechanical and thus the moving part(s) in the IR cut filter is easily damaged due to overuse; moreover, the IR cut filter also has problems of large size and high cost. Therefore, a new type of sensor (hereafter "RGBIr sensor") including red, green, blue and infrared pixels is developed.

An RGBIr sensor is applicable to a mobile phone, a laptop computer, a webcam, a game product, a smart appliance, etc. However, if a sensor itself has defective pixels (e.g., defective pixels caused by a manufacturing process), the values of the defective pixels outputted by the sensor will include error and/or lose fidelity, and if the error and/or the fidelity loss are/is passed without correction, the image on the screen will include abnormalities such as stuck pixels, dead pixels, hot pixels and dark pixels that are obvious to human eyes, in which the hot/dark pixels are those pixels relatively bright/dark in comparison with their neighboring pixels as the setting of display changes. Although nowadays there are techniques capable of compensating for the defective pixels of an RGB sensor, there is no effective technique capable of compensating for the defective pixels of an RGBIr sensor.

One technique of compensating for the defective pixels of an RGB sensor is found in the following literature: U.S. Pat. No. 8,164,660.

SUMMARY OF THE INVENTION

An objective of the present invention is to provide a defective pixel compensation method and a defective pixel compensation device capable of compensating for the defective pixels of an RGBIr sensor.

The present disclosure includes a defective pixel compensation method capable of compensating for the defective pixels of a sensor (e.g., RGBIr sensor) including four types of pixels. An embodiment of the defective pixel compensation method includes the following steps: determining a type of a sensor according to at least one sensor type signal(s); determining a plurality of sample positions according to the type of the sensor and a position of a target pixel; obtaining values of a plurality of reference pixels in a sampling window according to the sample positions; determining a value range and at least one compensation value(s) according to the values of the reference pixels; determining whether an input value of the target pixel is within the value range; and when the input value is within the value range, outputting the input value as an output value of the target pixel, and when the input value is outside the value range, outputting one of the compensation value(s) as the output value of the target pixel. In this embodiment, the four types of pixels are red pixels, green pixels, blue pixels and infrared pixels, and the type of the reference pixels (i.e., red pixels, green pixels, blue pixels or infrared pixels) is the same as the type of the target pixel.

The present disclosure also includes a defective pixel compensation device capable of compensating for the defective pixels of a sensor (e.g., RGBIr sensor) including four types of pixels. An embodiment of the defective pixel compensation device includes a reference pixel sampling circuit, a calculating circuit and a decision and compensation circuit. The reference pixel sampling circuit is configured to determine a plurality of sample positions according to a position of a target pixel so as to obtain values of a plurality of reference pixels in a sampling window according to the sample positions. The calculating circuit is configured to determine a value range and at least one compensation value(s) according to the values of the reference pixels. The decision and compensation circuit is configured to determine whether an input value of the target pixel is within the value range, and configured to compensate for the input value of the target pixel according to the compensation value(s) when the input value is outside the value range. In this embodiment, the four type of pixels are red pixels, green pixels, blue pixels and infrared pixels, and the type of the reference pixels (i.e., red pixels, green pixels, blue pixels or infrared pixels) is the same as the type of the target pixel.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this industrial field. If any term is defined in this specification, such term should be explained accordingly.

The present invention includes a defective pixel compensation method and a defective pixel compensation device that are capable of compensating for the defective pixels of a sensor including four types of pixels such as red pixels, green pixels, blue pixels and infrared pixels. For better understanding, the sensor mentioned in the following description is an RGBIr sensor; however, the present invention is applicable to other kinds of sensors as long as such application is practicable.

Figure 1:
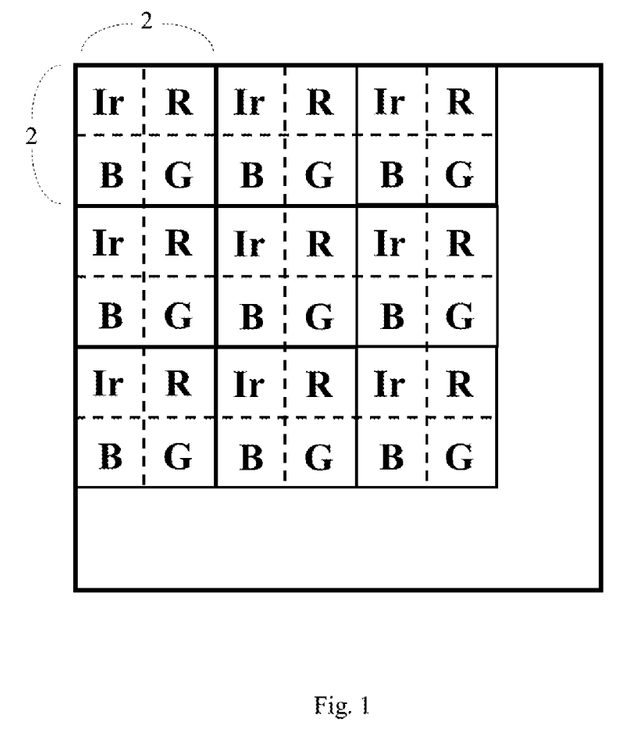
FIG. 1 shows an embodiment of the photo-sensitive macroblock of a 2×2 type sensor.
Figure 2:
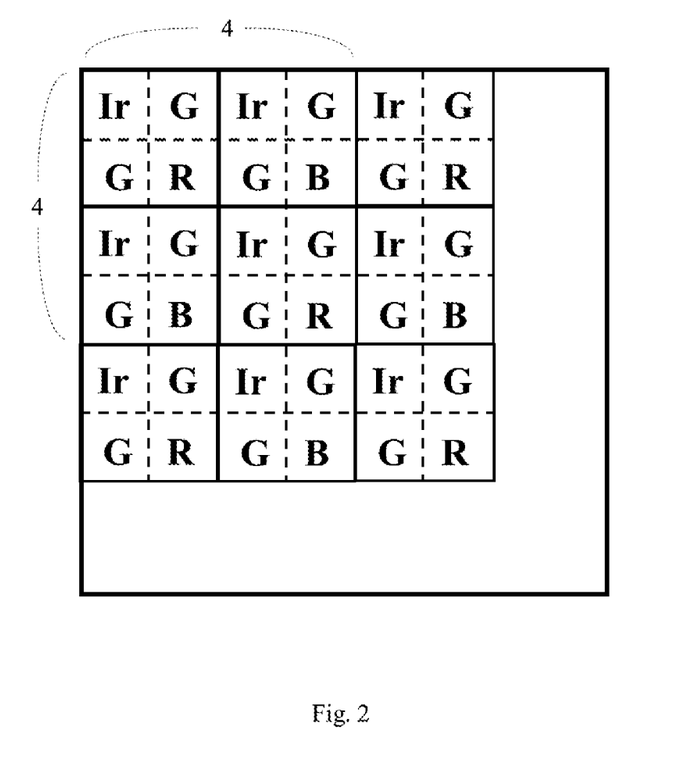
FIG. 2 shows an embodiment of the photo-sensitive macroblock of a 4×4 type sensor.

The photo-sensitive macroblock pixels of an RGBIr sensor include a plurality of basic photo-sensitive units. The pixel arrangement of a basic photo-sensitive unit could be the 2×2 type as shown in FIG. 1 (i.e., each basic photo-sensitive unit including four pixels) or the 4×4 type as shown in FIG. 2 (i.e., each basic photo-sensitive unit including sixteen pixels). In the figures of the present disclosure, the labels "R" stand for red pixels, the labels "G" stand for green pixels, the labels "B" stand for blue pixels and the labels "Ir" stand for infrared pixels. It should be noted that only a part of pixels of a sensor is shown in FIG. 1/FIG. 2, and the pixel arrangement of FIG. 1/FIG. 2 is exemplary for understanding rather than limitation in the implementation of the present invention. In order to determine whether a target pixel (i.e., the labels "T" in the figures of the present disclosure) is defective, the present invention takes a plurality of pixels neighboring the target pixel as reference pixels according to a sampling window and thereby determine whether the target pixel is defective according to the reference pixels. The types of the reference pixels are the same as the type of the target pixel (e.g., all the reference pixels and the target pixel being red pixels, green pixels, blue pixels or infrared pixels); however, the type(s) of one or more reference pixel(s) could be different from the type of the target pixel as long as an implementation under such circumstances is practicable.

Figure 3:
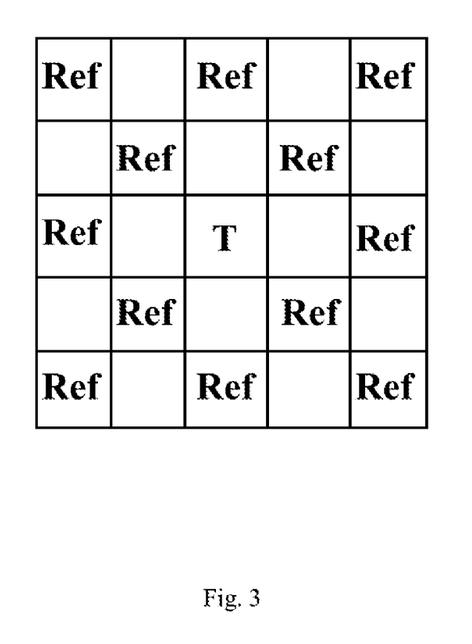
FIG. 3 shows an exemplary way of the present invention to select reference pixels.
Figure 4:
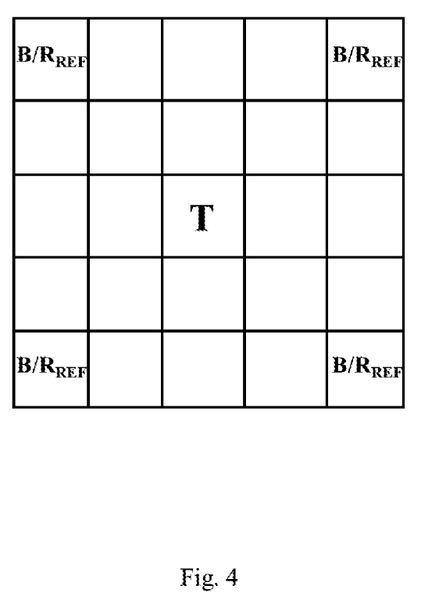
FIG. 4 shows another exemplary way of the present invention to select reference pixels.
Figure 5:
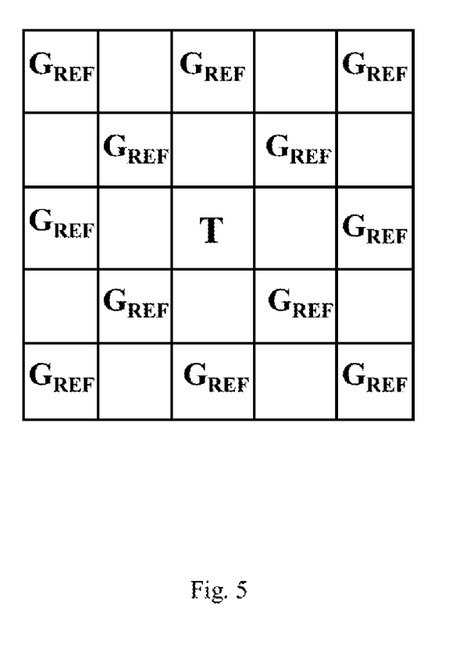
FIG. 5 shows a further exemplary way of the present invention to select reference pixels.
Figure 6:
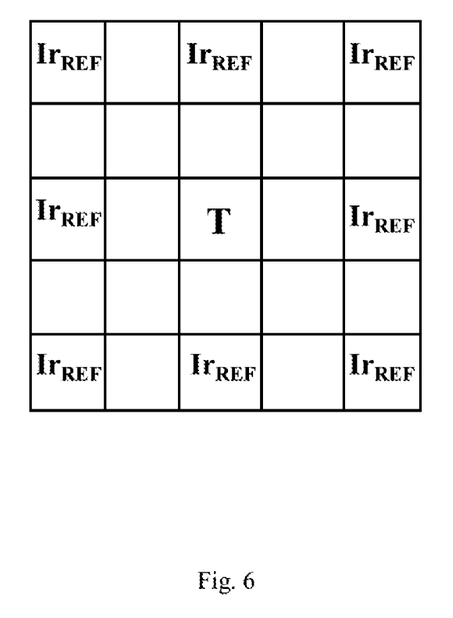
FIG. 6 shows a further exemplary way of the present invention to select reference pixels.

For better understanding, in the following description the RGBIr sensor adopts the 2×2 type of basic photo-sensitive unit (hereafter, "2×2 type RGBIr sensor") while the sampling window in the following description is 5×5 (i.e., 25 pixels in the sampling window); of course people of ordinary skill in the art can appreciate how to use other kinds of RGBIr sensor (e.g., an RGBIr sensor adopting the 4×4 type of basic photo-sensitive unit, hereafter "4×4 type RGBIr sensor") and/or adopt other dimensions of sampling window (e.g., 3×3, 3×5, 5×3, 5×7, 7×5, 7×7, 7×9, 9×7 or 9×9) in accordance with the present disclosure. It should be noted that once the type of an RGBIr sensor (e.g., the type of basic photo-sensitive unit of the RGBIr sensor and the dimension of the RGBIr sensor) and the position of a target pixel (e.g., the coordinate of the target pixel relative to the other pixels of the RGBIr sensor, in which the determination of the coordinate is well known in this industrial field) are ascertained, the pixels treated as the reference pixels in the sampling window will be ascertained, too. For instance, provided that a target pixel is at the center of a 5×5 sampling window and the type of the target pixel is identical to the type of reference pixels, if a sensor is a 2×2 type RGBIr sensor, the reference pixels relative to the target pixel are shown in FIG. 3, in which the labels "Ref" stand for the reference pixels, the label "T" stands for the target pixel, and all the target pixel and the reference pixels are red pixels, green pixels, blue pixels or infrared pixels; if a sensor is a 4×4 type RGBIr sensor and the target pixel is a blue pixel or a red pixel, the reference pixels relative to the target pixel are shown in FIG. 4, in which the labels "B/R$_{REF}$" stand for the reference pixels (blue or red pixels) and the label "T" stands for the target pixel; if a sensor is a 4×4 type RGBIr sensor and the target pixel is a green pixel, the reference pixels relative to the target pixel are shown in FIG. 5, in which the labels "G$_{REF}$" stand for the reference pixels (green pixels) and the label "T" stands for the target pixel; if a sensor is a 4×4 type RGBIr sensor and the target pixel is an infrared pixel, the reference pixels relative to the target pixel are shown in FIG. 6, in which the labels "Ir$_{REF}$" stand for the reference pixels (infrared pixels) and the label "T" stands for the target pixel. For another instance, in a sampling window only some pixels among all the pixels whose type is identical to the type of the target pixel are selected as the reference pixels. For a further instance, provided that a target pixel is not at the center of a sampling window (e.g., a 6×6 sampling window), the target pixel will be one of the pixels closest to the center and the positions of the reference pixels in the sampling window can be determined according to the type of the sensor and the position of the target pixel.

Figure 7:
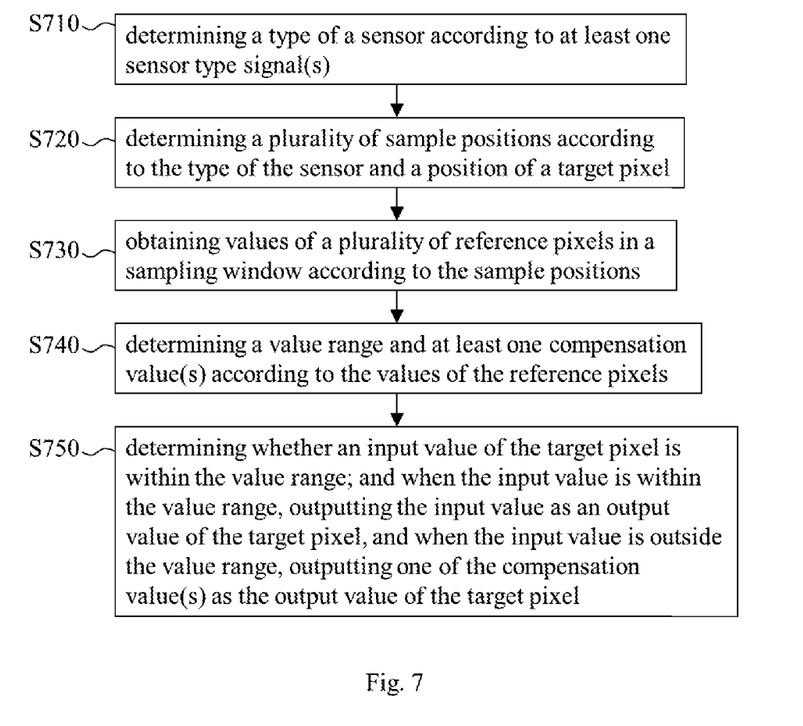
FIG. 7 shows an embodiment of the defective pixel compensation method of the present invention.

FIG. 7 shows an embodiment of the defective pixel compensation method of the present invention which can be carried out by the defective pixel compensation device of the present invention or the equivalent thereof. This embodiment includes the following steps:

step S710: determining a type of a sensor according to at least one sensor type signal(s). The sensor type signal(s) can originate from the sensor itself or from an external device, or from a device carrying out the defective pixel compensation method according to user setting; of course other known or self-develop ways to provide the sensor type signal(s) can be used in this step.

step S720: determining a plurality of sample positions according to the type of the sensor and a position of a target pixel. For instance, the sample positions are the positions of the reference pixels in one of FIGS. 3-6.

step S730: obtaining values of a plurality of reference pixels in a sampling window according to the sample positions. For instance, the values of the reference pixels are the values of the reference pixels in one of FIGS. 3-6.

step S740: determining a value range and at least one compensation value(s) according to the values of the reference pixels. An instance of this step is described in a later paragraph.

step S750: determining whether an input value of the target pixel (e.g., an original pixel value of the target pixel, or a value of the target pixel outputted by a preceding image processing stage that is executed before the present method) is within the value range; and when the input value is within the value range, outputting the input value as an output value of the target pixel, and when the input value is outside the value range, outputting one of the compensation value(s) as the output value of the target pixel. An instance of this step is described in a later paragraph.

Figure 8:
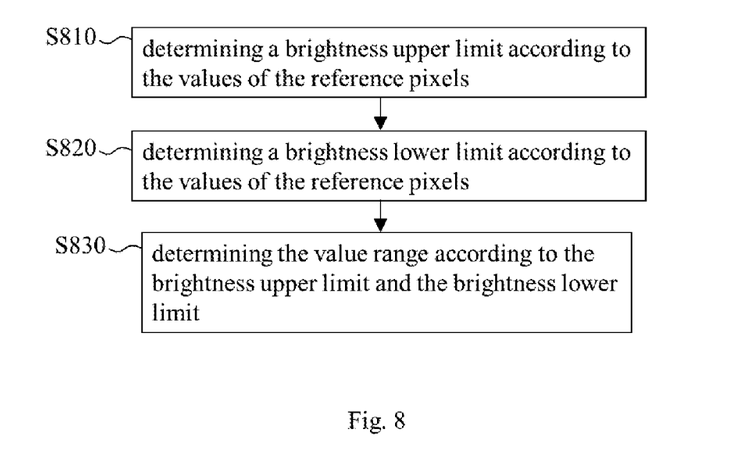
FIG. 8 shows steps according to an embodiment of step S740 of FIG. 7.

As shown in FIG. 8, an embodiment of step S740 of FIG. 7 includes the following steps:

step S810: determining a brightness upper limit according to the values of the reference pixels. For instance, the composition of the brightness upper limit includes a brightness reference level which is equal to the brightness upper limit or is a part of the brightness upper limit. For another instance, the values of the reference pixels include a maximum, a median and a minimum, and the brightness reference level is between the maximum and the median (e.g., the brightness reference level being equal to the maximum or the second largest value among the values of the reference pixels), in which the maximum and the minimum can be obtained by performing an incremental sort or a decremental sort to the values of the reference pixels. For a further instance, the composition of the brightness upper limit includes the brightness reference level and at least one of the following levels: an edge feature reference level and a bright area shift level (e.g., the brightness upper limit being equal to the sum of the brightness reference level, the edge feature reference level and the bright area shift level), in which the edge feature reference level is for adjusting the brightness upper limit and a brightness lower limit mentioned in a later paragraph when the target pixel is found at/near an image edge, and the bright area shift level is for adjusting the brightness upper limit according to the brightness of the reference pixels. An instance of the edge feature reference level and an instance of the bright area shift level are described in a later paragraph.

step S820: determining a brightness lower limit according to the values of the reference pixels. For instance, the composition of the brightness lower limit includes a darkness reference level which is equal to the brightness lower limit or is a part of the brightness lower limit. For another instance, the darkness reference level is between the aforementioned median and the aforementioned minimum (e.g., the brightness reference level being equal to the minimum or the second smallest value among the values of the reference pixels). For a further instance, the composition of the brightness lower limit includes the brightness reference level and at least one of the following levels: the aforementioned edge feature reference level and a dark area shift level (e.g., the brightness lower limit being equal to the darkness reference level minus the sum of the edge feature reference level and the dark area shift level, in which the dark area shift level is for adjusting the brightness lower limit according to the brightness of the reference pixels. An instance of the dark area shift level is described in a later paragraph.

step S830: determining the value range according to the brightness upper limit and the brightness lower limit. For instance, the value range is the range between the brightness upper limit and the brightness low limit, and the aforementioned compensation values include the brightness reference level and the darkness reference level; consequently, in step S750, when the input value of the target pixel is greater than the brightness upper limit, the brightness reference level is outputted as the output value of the target pixel so as to prevent the display of the target pixel from being too bright, and when the input value of the target pixel is less than the brightness lower limit, the darkness reference level is outputted as the output value of the target pixel so as to prevent the display of the target pixel from being too dark.

In an embodiment, the aforementioned edge feature reference level is generated by calculating the values of the reference pixels according a predetermined edge level algorithm; for instance, the edge feature reference level is equal to a coefficient of variation of the reference pixels multiplied by an edge rate (e.g., a value between 0 and 1), in which the edge rate could be predetermined or determined according to user demand. In an embodiment, the edge feature reference level is generated by detecting the target pixel according to an edge detection algorithm; for instance, the edge detection algorithm adopts Sobel Operator to obtain the transverse gradient approximation of the target pixel and the longitudinal gradient approximation of the target pixel (e.g., $$G_x = \begin{bmatrix} -1 & 0 & +1 \\ -2 & 0 & +2 \\ -1 & 0 & +1 \end{bmatrix} \times A; \quad G_y = \begin{bmatrix} -1 & -2 & +1 \\ 0 & 0 & 0 \\ +1 & +2 & +1 \end{bmatrix} \times A,$$

in which $G_X$ is the transverse gradient approximation, $G_Y$ is the longitudinal gradient approximation, A is a 3×3 pixel matrix while the central value of the matrix is the value of the target pixel), then the edge detection algorithm obtains the gradient of the target pixel (e.g., $G=\sqrt{G_x^2+G_y^2}$) according to the transverse gradient approximation and the longitudinal gradient approximation, and then the edge detection algorithm multiplies the gradient of the target pixel by the edge rate to obtain the edge feature reference level.

Figure 9:
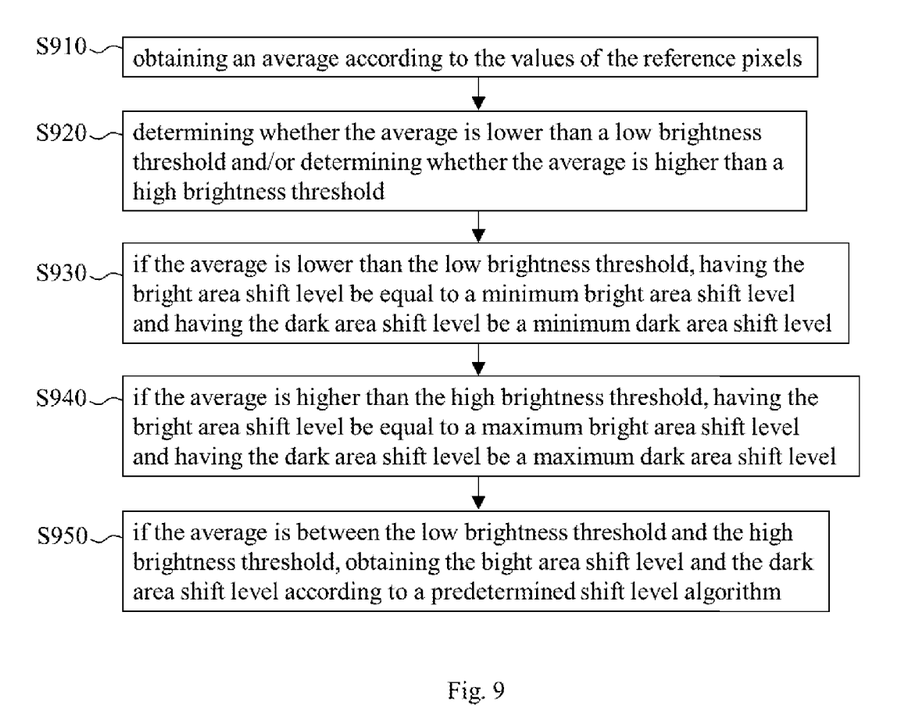
FIG. 9 shows an embodiment of generating the bright area shift level and the dark area shift level of the present disclosure.

As shown in FIG. 9, in an embodiment the aforementioned bright area shift level and the aforementioned dark area shift level are generated according to at least the following steps:

step S910: obtaining an average (e.g., the average or the weighted average of the values of the reference pixels) according to the values of the reference pixels.

step S920: determining whether the average is lower than a low brightness threshold (e.g., if the value of each reference pixel is between 0 and 255, the low brightness threshold is set between 15 and 112) and/or determining whether the average is higher than a high brightness threshold (e.g., if the value of each reference pixel is between 0 and 255, the high brightness threshold is set between 142 and 240). In this step, if the average is found lower than the low brightness threshold first, it will be self-evident that the average is not higher than the high brightness threshold; similarly, if the average is found higher than the high brightness threshold first, it will be self-evident that the average is not lower than the low brightness threshold.

step S930: if the average is lower than the low brightness threshold, having the bright area shift level be equal to a minimum bright area shift level (e.g., 4, or a value capable of assisting in determining whether the target pixel is relatively bright in a dark area) and having the dark area shift level be a minimum dark area shift level (e.g., 8, or a value capable of assisting in determining whether the target pixel is relatively dark in a dark area).

step S940: if the average is higher than the high brightness threshold, having the bright area shift level be equal to a maximum bright area shift level (e.g., 8, or a value capable of assisting in determining whether the target pixel is relatively bright in a bright area) and having the dark area shift level be a maximum dark area shift level (e.g., 4, or a value capable of assisting in determining whether the target pixel is relatively dark in a bright area).

step S950: if the average is between the low brightness threshold and the high brightness threshold, obtaining the bight area shift level and the dark area shift level according to a predetermined shift level algorithm. For instance, the predetermined shift level algorithm has the bright area shift level be equal to the result of the following equation: the minimum bright area shift level+(maximum bright area shift level−minimum bright area shift level)×(the average−the low brightness threshold)÷128; and the predetermined shift level algorithm has the dark area shift level be equal to the result of the following equation: the minimum dark area shift level+(maximum dark area shift level−minimum dark area shift level)×(the average−the low brightness threshold)÷128.

Figure 10:
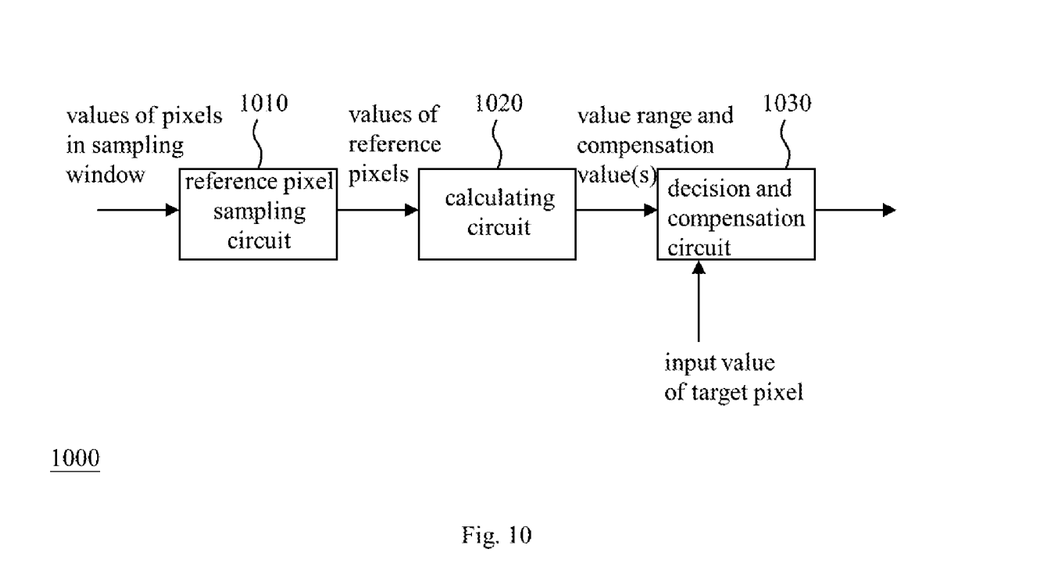
FIG. 10 shows an embodiment of the defective pixel compensation device of the present invention.

FIG. 10 shows an embodiment of the defective pixel compensation device of the present invention. The defective pixel compensation device 1000 of FIG. 10 is an image processor (e.g., an image processing integrated circuit) capable of executing the defective pixel compensation method of the present invention. The defective pixel compensation device 1000 includes a reference pixel sampling circuit 1010, a calculating circuit 1020 and a decision and compensation circuit 1030. The reference pixel sampling circuit 1010 is configured to determine a plurality of sample positions according to a position of a target pixel in a sampling window so as to obtain values of a plurality of reference pixels in the sampling window according to the sample positions; for instance, the reference pixel sampling circuit 1010 receives the values of all pixels in the sampling window, then determines the sample positions according to the position of the target pixel in the sampling window, and then obtain the values of the reference pixels according to the sample positions. The calculating circuit 1020 is configured to determine a value range and at least one compensation value(s) according to the values of the reference pixels. The decision and compensation circuit 1030 is configured to determine whether an input value of the target pixel is within the value range, and configured to compensate for the input value of the target pixel according to the compensation value(s) when the input value is outside the value range. People of ordinary skill in the art can realize the detective pixel compensation device 1000 with known circuits and techniques in accordance with the present disclosure.

Since those of ordinary skill in the art can appreciate the detail and the modification of the device embodiment by referring to the aforementioned method embodiments, which means that the features of the method embodiments can be applied to the device embodiment in a reasonable way, repeated and redundant description having little to do with understanding and enablement of the device embodiment is omitted here.

It should be noted that people of ordinary skill in the art can implement the present invention by selectively using some or all of the features of any embodiment in this specification or selectively using some or all of the features of two or more embodiments in this specification as long as such implementation is practicable, which implies that the present invention can be carried out flexibly. It should also be noted that the numbers and the algorithms in the aforementioned embodiments are exemplary for understanding, and those of ordinary skill in the art can set the numbers and use/develop suitable algorithms according to the present disclosure in view of their demand.

To sum up, the present invention can generate main information (e.g., the aforementioned brightness reference level and the aforementioned darkness reference level) and thereby determine whether a target pixel of an RGBIr sensor is defective according to the main information, and if the target pixel is found defective, the present invention will make compensation. In addition, the present invention can optionally generate auxiliary information (e.g., the aforementioned edge feature reference level, bright area shift level and dark area shift level) and thereby determine whether the target pixel is defective according to the main information and the auxiliary information.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A defective pixel compensation method capable of compensating for defective pixels of a sensor including four types of pixels, the method comprising:

determining a type of the sensor indicative of a basic photo-sensitive unit of the sensor according to at least one sensor type signal(s);

determining a plurality of sample positions according to the type of the sensor and a position of a target pixel;

obtaining values of a plurality of reference pixels in a sampling window according to the sample positions;

determining a value range and at least one compensation value(s) according to the values of the reference pixels;

determining whether an input value of the target pixel is within the value range; and when the input value is within the value range, outputting the input value as an output value of the target pixel, and when the input value is outside the value range, outputting one of the compensation value(s) as the output value of the target pixel, wherein the values of the reference pixels include a maximum, a median and a minimum, the compensation values include a brightness reference level and a darkness reference level, the brightness reference level is between the maximum and the median, and the darkness reference level is between the median and the minimum.

2. The defective pixel compensation method of claim 1, wherein the four types of pixels are red pixels, green pixels, blue pixels and infrared pixels.

3. The defective pixel compensation method of claim 1, wherein the position of the target pixel is at a center of the sampling window.

4. The defective pixel compensation method of claim 1, wherein a type of the reference pixels is the same as a type of the target pixel.

5. The defective pixel compensation method of claim 1, wherein the step of determining the value range includes: determining a brightness upper limit according to the values of the reference pixels; determining a brightness lower limit according to the values of the reference pixels; and determining the value range according to the brightness upper limit and the brightness lower limit.

6. A defective pixel compensation method capable of compensating for defective pixels of a sensor including four types of pixels, the method comprising:

determining a type of the sensor indicative of a basic photo-sensitive unit of the sensor according to at least one sensor type signal(s);

determining a plurality of sample positions according to the type of the sensor and a position of a target pixel;

obtaining values of a plurality of reference pixels in a sampling window according to the sample positions;

determining a value range and at least one compensation value(s) according to the values of the reference pixels, wherein determining the value range includes: determining a brightness upper limit according to the values of the reference pixels; determining a brightness lower limit according to the values of the reference pixels; and determining the value range according to the brightness upper limit and the brightness lower limit;

determining whether an input value of the target pixel is within the value range; and when the input value is within the value range, outputting the input value as an output value of the target pixel, and when the input value is outside the value range, outputting one of the compensation value(s) as the output value of the target pixel, wherein a composition of the brightness upper limit includes a brightness reference level, a composition of the brightness lower limit includes a darkness reference level, the compensation values include the brightness reference level and the darkness reference level, the brightness reference level is treated as the output value of the target pixel when the input value of the target pixel is greater than the brightness upper limit, and the darkness reference level is treated as the output value of the target pixel when the input value of the target pixel is smaller than the brightness lower limit.

7. The defective pixel compensation method of claim 6, wherein the values of the reference pixels include a maximum, a median and a minimum, the brightness reference level is between the maximum and the median, and the darkness reference level is between the median and the minimum.

8. The defective pixel compensation method of claim 7, wherein the step of determining the value range includes: performing an incremental sort or a decremental sort to the values of the reference pixels and thereby finding out the maximum and the minimum.

9. The defective pixel compensation method of claim 6, wherein the brightness upper limit is the brightness reference level and the brightness lower limit is the darkness reference level.

10. The defective pixel compensation method of claim 5, wherein a composition of the brightness upper limit includes a brightness reference level and at least one of an edge feature reference level and a bright area shift level, and a composition of the brightness lower limit includes a darkness reference level and at least one of the edge feature reference level and a dark area shift level.

11. The defective pixel compensation method of claim 10, wherein the brightness upper limit is equal to a sum of the brightness reference level, the edge feature reference level and the bright area shift level, and the brightness lower limit is equal to the darkness reference level minus a sum of the edge feature reference level and the dark area shift level.

12. The defective pixel compensation method of claim 10, wherein the edge feature reference level is generated by detecting the target pixel according to an edge detection algorithm, or the edge feature reference level is generated by calculating the values of the reference pixels according to a predetermined edge level algorithm.

13. The defective pixel compensation method of claim 10, wherein the bright area shift level and the dark area shift level are generated according to at least following steps:
obtaining an average according to the values of the reference pixels;
determining whether the average is lower than a low brightness threshold and/or determining whether the average is higher than a high brightness threshold;
if the average is lower than the low brightness threshold, having the bright area shift level be equal to a minimum bright area shift level and having the dark area shift level be a minimum dark area shift level;
if the average is higher than the high brightness threshold, having the bright area shift level be equal to a maximum bright area shift level and having the dark area shift level be a maximum dark area shift level; and
if the average is between the low brightness threshold and the high brightness threshold, obtaining the bight area shift level and the dark area shift level according to a predetermined shift level algorithm.

14. A defective pixel compensation device capable of compensating for defective pixels of a sensor including four types of pixels, the defective pixel compensation device comprising:
a reference pixel sampling circuit configured to determine a plurality of sample positions according to a position of a target pixel so as to obtain values of a plurality of reference pixels in a sampling window according to the sample positions;
a calculating circuit configured to determine a value range and at least one compensation value(s) according to the values of the reference pixels; and
a decision and compensation circuit configured to determine whether an input value of the target pixel is within the value range, and configured to compensate for the input value of the target pixel according to the compensation value(s) when the input value is outside the value range,
wherein the values of the reference pixels include a maximum, a median and a minimum, the compensation values include a brightness reference level and a darkness reference level, the brightness reference level is between the maximum and the median, and the darkness reference level is between the median and the minimum.

15. The defective pixel compensation device of claim 14, wherein the four types of pixels are red pixels, green pixels, blue pixels and infrared pixels.

16. The defective pixel compensation device of claim 14, wherein the position of the target pixel is at a center of the sampling window.

17. The defective pixel compensation device of claim 14, wherein a type of the reference pixels is the same as a type of the target pixel.

18. The defective pixel compensation device of claim 14, wherein the calculating circuit executes an incremental sort or a decremental sort according to the values of the reference pixels and thereby finds out the maximum and the minimum.

19. The defective pixel compensation method of claim 1, wherein the basic photo-sensitive unit of the sensor is a 2 by 2 pixel array or a 4 by 4 pixel array.

* * * * *